US010483569B2

(12) United States Patent
Ihonen

(10) Patent No.: US 10,483,569 B2
(45) Date of Patent: Nov. 19, 2019

(54) METHOD AND SYSTEM FOR ELIMINATING REVERSE CURRENT DECAY IN FUEL CELLS

(71) Applicant: Teknologian tutkimuskeskus VTT Oy, Espoo (FI)

(72) Inventor: Jari Ihonen, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 231 days.

(21) Appl. No.: 15/320,824

(22) PCT Filed: Jun. 29, 2015

(86) PCT No.: PCT/FI2015/050477

§ 371 (c)(1),
(2) Date: Dec. 21, 2016

(87) PCT Pub. No.: WO2016/001487

PCT Pub. Date: Jan. 7, 2016

(65) Prior Publication Data

US 2017/0200959 A1 Jul. 13, 2017

(30) Foreign Application Priority Data

Jun. 30, 2014 (FI) ..................................... 20145635

(51) Int. Cl.
*H01M 8/04303* (2016.01)
*H01M 8/04746* (2016.01)
(Continued)

(52) U.S. Cl.
CPC ... *H01M 8/04303* (2016.02); *H01M 8/04492* (2013.01); *H01M 8/04776* (2013.01); *H01M 8/0687* (2013.01)

(58) Field of Classification Search
CPC ......... H01M 8/04303; H01M 8/04492; H01M 8/04776; H01M 8/0687
See application file for complete search history.

(56) References Cited

U.S. PATENT DOCUMENTS 8,232,014 B2 7/2012 Arthur et al.
2002/0102443 A1 8/2002 Yang et al.
(Continued)

FOREIGN PATENT DOCUMENTS

DE 102004042806 A1 3/2006
DE 102012000882 A1 7/2013
(Continued)

OTHER PUBLICATIONS

Reiser, Carl et.al., "A Reverse-Current Decay Mechanism for Fuel Cells," Electrochemical and Solid-State Letters, vol. 8, No. 6, 2005, pp. A273-A276.

(Continued)

*Primary Examiner* — Carlos Barcena
(74) *Attorney, Agent, or Firm* — Seppo Laine Oy

(57) ABSTRACT

The invention relates to a system and a method for eliminating reverse current decay in the fuel cells. According to the invention, the system comprises

- a fuel cell having an anode and a cathode;
- a fuel feed system for supplying the anode of the fuel cell with fuel and forming an anode system;
- a bypass line fitted in parallel and in flow connection with said anode system and capable of circulating fuel past the anode;
- an oxygen reduction unit; and
- a pressure unit for circulating gas in at least part of said anode system and said bypass line.

The bypass line is adapted to receive and circulate a flow of hydrogen during a fuel cell shutdown in order to mix the hydrogen with any oxygen present in the anode system, and (Continued)

to remove the oxygen from the anode system in said oxygen reduction unit by catalytic conversion. A control unit for receiving sensing signals representative of the state of the oxygen reduction process and controlling the amount of hydrogen passing through the system in response to said sensor is also described.

7 Claims, 2 Drawing Sheets

(51) Int. Cl.
*H01M 8/04492* (2016.01)
*H01M 8/0662* (2016.01)

(56) References Cited

U.S. PATENT DOCUMENTS

| | | | |
|---|---|---|---|
| 2003/0138680 | A1 | 7/2003 | Goebel et al. |
| 2005/0136304 | A1 | 6/2005 | Pettit et al. |
| 2006/0093879 | A1 | 5/2006 | Yang et al. |
| 2008/0152972 | A1 | 6/2008 | Igarashi et al. |
| 2008/0233442 | A1 | 9/2008 | Takada |
| 2011/0143243 | A1 | 6/2011 | Arthur et al. |
| 2013/0196240 | A1 | 8/2013 | Furusawa et al. |

FOREIGN PATENT DOCUMENTS

| | | | |
|---|---|---|---|
| JP | 2005078900 | A | 3/2005 |
| JP | 2005515603 | A | 5/2005 |
| JP | 2006147550 | A | 6/2006 |
| JP | 2007534108 | A | 11/2007 |
| JP | 2012212567 | A | 11/2012 |
| WO | WO 03061040 | A1 | 7/2003 |
| WO | WO2005018017 | A2 | 2/2005 |
| WO | WO 2010026819 | A1 | 3/2010 |
| WO | WO 2011039421 | A1 | 4/2011 |

OTHER PUBLICATIONS

Yu, Yi et al., “A review on performance degradation of proton exchange membrane fuel cells during startup and shutdown processes: Causes, consequences, and mitigation strategies,” Journal of Power Sources, vol. 205, 2012, pp. 10-23.

METHOD AND SYSTEM FOR ELIMINATING REVERSE CURRENT DECAY IN FUEL CELLS

FIELD OF THE INVENTION

The present invention relates to fuel cells, particularly to hydrogen fuel cells. More specifically, the invention relates to removal of harmful gases in hydrogen fuel cells during a start-up.

BACKGROUND OF THE INVENTION

A fuel cell is a device that converts the chemical energy from a fuel into electricity through a chemical reaction with oxygen or another oxidizing agent. Hydrogen is themost common fuel, but hydrocarbons such as natural gas and alcohols like methanol are sometimes used. Fuel cells, unlike batteries, require a continuous source of fuel and oxygen/air to sustain the chemical reaction to generate an electromotive force (emf). Fuel cells continue to produce electricity for as long as these inputs are supplied.

A proton exchange membrane fuel cells (PEMFC) is a typical fuel cell design, where a proton-conducting polymer membrane (electrolyte) separates the anode and cathode sides, allowing charges to move between the two sides of the fuel cell. Electrons are drawn from the anode to the cathode through an external circuit, producing the direct current emf. The startup time for a PEMFC is in the range of 1 second. Individual fuel cells produce relatively small electrical potentials, about 0.7 volts, so cells are "stacked", or placed in series, to increase the voltage and meet an application's requirements. In addition to electricity, fuel cells produce water, heat and, depending on the fuel source, very small amounts of nitrogen dioxide and other emissions. The energy efficiency of a fuel cell is generally between 40-60%, or up to 85% efficient in cogeneration if waste heat is captured for use.

To deliver the desired amount of energy, the fuel cells are combined in series and parallel circuits to yield a higher voltage and/or current supply. Such a design is called a fuel cell stack. When the cell surface area is increased, stronger current can be drawn from each cell. In the stack, reactant gases must be distributed uniformly over all of the cells to maximize the power output.

In many practical applications, there are problems which contamination of the fuel cells, which reduces the operating life of the cells. Attempts have been made to lengthen the operating life of fuel cells by increasing the degree of purity of the hydrogen fuel, which increases the costs of manufacturing and distributing the hydrogen, and which will not eliminate certain problems that accumulates over time when the fuel cell is, as in automotive applications, repeatedly started and shut down, often for a prolonged period of time.

In automotive fuel cells systems some general operation principles are common and aimed at avoiding that the fuel cell stack is damaged by reverse current decay during shut-down. When automotive fuel cell systems have short shut downs the anode and cathode have hydrogen rich environment, as typically oxygen should be consumed from the cathode side during the shut-down process. This means that right after shut-down, there are mostly nitrogen and hydrogen present on the anode, while on the cathode there is mostly nitrogen and a small amount of oxygen. During a shut-down, an interchange of gases (oxygen, hydrogen and inert gases) through the membrane will occur. All the oxygen from the cathode or all the hydrogen from the anode is thus slowly consumed.

The problem is that during a longer shut-down, there will be slow diffusion of oxygen from both inlet and exhaust side to the cathode. This oxygen will eventually diffuse to the anode through the membrane, resulting in an oxygen atmosphere in both electrodes of the cells. When the system is started again and the main valve for hydrogen is opened, the anode system will typically contain a mix of oxygen, nitrogen, hydrogen and small amounts of other gases, until all other gases but hydrogen are purged out.

This mixing of gases causes a reverse current decay in the fuel cells, and was first reported by Reiser et. al. in Electrochemical and Solid-State Letters (2005), Volume 8, Number 6, pp. A273-A276. The electrolyte potential drops from 0 to −0.59 V when the anode is exposed to hydrogen and oxygen. This causes an opposite current flow to normal fuel cell mode at the oxygen-exposed region and raises the cathode interfacial potential difference to 1.44 V. This high voltage causes carbon corrosion which degrades the carbon carrier of the catalyst, which is usually a precious metal like platinum, or some other selected metals. In laboratory and in some stationary systems the problem can be solved by purging the anode system with nitrogen or some other inert gas before feeding in hydrogen. However, in automotive fuel cell systems there is no nitrogen source available.

Various solutions have been presented to overcome this problem. In WO 2010026819 is shown a fuel cell system that supplies predetermined amount of hydrogen held in a hydrogen supply flow channel to fuel pole side of fuel cell stack during system non-operation period. A similar solution is discussed in U.S. Pat. No. 8,232,014, disclosing a method for reducing the probability of air/hydrogen front in fuel cell stack, and involves injecting discrete amount of hydrogen into the anode side of fuel cell stack according to a predefined schedule. According to the method, hydrogen is periodically injected into a fuel cell stack after system shutdown to consume low levels of oxygen, as it diffuses back into the stack. These solutions are rather complicated and require separate control systems to monitor the conditions in the fuel cell and to inject hydrogen at an appropriate time and amount.

An alternative approach is presented in DE 102004042806, where is described a fuel cell system for a vehicle with catalytic converters in the inlet and outlet of the anode region to protect the anode from residual hydrogen by turning it into water. The hydrogen would otherwise diffuse into the anode while the fuel cell is turned-off and the region is filled with air/oxygen. This will however have no positive effect in the startup phase when hydrogen is forcedly entering the anode.

In WO 2011/039421 is presented a solution for general purification of fuel cell reactants by using slip stream filtering techniques. There a filter is added to the anode circulation to remove enriched impurities. Slip stream filters are an efficient and economical remedy to constantly clean streams of circulating liquids. Typically, a small stream of the liquid is directed into a bypass circulation containing a filter. Over time, most if not the entire volume of liquid will pass through the filter and become cleaned. A simple flow indicator beside the filter may allow the filter action to be gauged and announce the need to change or clean the filter.

When an inventive PEMFC system is started by first starting a gas circulation pump, then part of the anode gas (oxygen and nitrogen in the beginning) will flow though a slip-stream filter. When the filter is equipped with a catalytic burner, the oxygen in the anode gas can be consumed. By keeping the hydrogen flow smaller than what is needed to reduce the oxygen, there will not be residual hydrogen in the gas exiting from the filter before almost all oxygen is consumed, that would cause a problem addressed in the aforesaid publication DE 102004042806. A suitable amount of hydrogen to reduce the oxygen in the air (containing 21% $O_2$), is 4% or less. The lower flammability limit of hydrogen in air at normal pressure (1 atm) is 4%, and should thus not be exceeded.

When all oxygen is consumed, there will be only hydrogen and inert gases left in the anode, and the main line for hydrogen can be opened without the problem of hydrogen/oxygen mixing and catalyst degradation. The burning process is inherently fast, taking only seconds to complete depending on the gas volumes involved and the circulation pump capacity in use, but this delay does not need to interfere with e.g. starting a car, as battery energy can be used during any fuel cell start-up delays.

According to the invention, an inventive system for eliminating reverse current decay in fuel cells comprises:

a fuel cell having an anode and a cathode;

a fuel feed system for supplying the anode of the fuel cell with fuel and forming an anode system;

a bypass line fitted in parallel and in flow connection with said anode system and capable of circulating fuel past the anode;

an oxygen reduction unit;

a pressure unit for circulating gas in at least part of said anode system and said bypass line.

The bypass line is adapted to receive and circulate a flow of hydrogen during a fuel cell shutdown in order to mix the hydrogen with any oxygen present in the anode system, and to remove it from the anode system in said oxygen reduction unit by reducing the oxygen from the gas flow by catalytic conversion.

The present invention relies on the insight that it is possible to eliminate the oxygen from the anode side before letting the hydrogen in to the stack of the fuel cell. This can according to one embodiment be done by catalytic burning of oxygen. In a further embodiment of the invention, the oxygen burner or catalytic converter may be part of the bypass line. It may also be combined with a slipstream filter. Such a filter can be used for purifying hydrogen when the fuel cell is on, as shown in WO 2011/039421, and additionally to clean oxygen/nitrogen gases while the fuel cell is stopped. In this case no extra circulation systems in the hydrogen line are needed, but the oxygen present in the anode system can be burnt as part of the start-up procedure of the fuel cell.

Generally, the bypass line may be fitted between the main anode fuel feed line and the fuel return line in a loop, and it is branched from the main fuel line for the fuel cell and is provided with a valve for feeding an appropriate amount of hydrogen to the oxygen reduction unit in order to catalytically convert the oxygen present in the anode system into water.

The invention also encompasses a method for eliminating reverse current decay in fuel cells, comprising the steps of:

providing a fuel cell with a cathode and an anode and a fuel feed system for the anode forming an anode system;

providing a bypass line fitted in parallel and in flow connection with said anode system capable of circulating fuel past the anode;

feeding during a fuel cell shutdown condition a flow of hydrogen into said bypass line in order to mix the hydrogen with any oxygen present in the anode system:

circulating the gas flow in at least part of said anode system and said bypass line to an oxygen reduction unit;

reducing in said oxygen reduction unit any oxygen present in the anode system by catalytic conversion.

The method may comprise an additional step of filtering the gas in the bypass line in order to remove any impurities from the gas flow. In one embodiment, the gas in the bypass line is circulated in a loop, which also includes the main anode fuel feed line and the fuel return line. An appropriate amount of hydrogen is fed and circulated through the bypass line to the oxygen reduction unit in order to catalytically convert the oxygen present in the anode system into water. Preferably, the required amount of hydrogen that is fed into the oxygen reduction unit is controlled by hydrogen and/or oxygen sensors that may reside at, before and/or after the oxygen reduction unit, or elsewhere in the circulation loop. In one embodiment, the oxygen consumption is sensed by measuring moisture, e.g. the water generation at the oxygen reduction unit. The more accurately the system can measure the amount of hydrogen and oxygen present in the system, the better the start-up of the fuel cell can be optimized and the start-up delay minimized.

The present invention is typically applied in a hydrogen fuel cell, preferably in a closed-end hydrogen fuel cell, but it can also be used in fuel cells using other fuels, in order to remove impurities essentially continuously. Most advantageously, the method and system are applied to clean the anode gas in a closed-end hydrogen fuel cell.

BRIEF DESCRIPTION OF THE DRAWINGS

In the following, the embodiments and advantages of the invention are examined in greater detail with reference to the accompanying figures, wherein.

Figure 1:
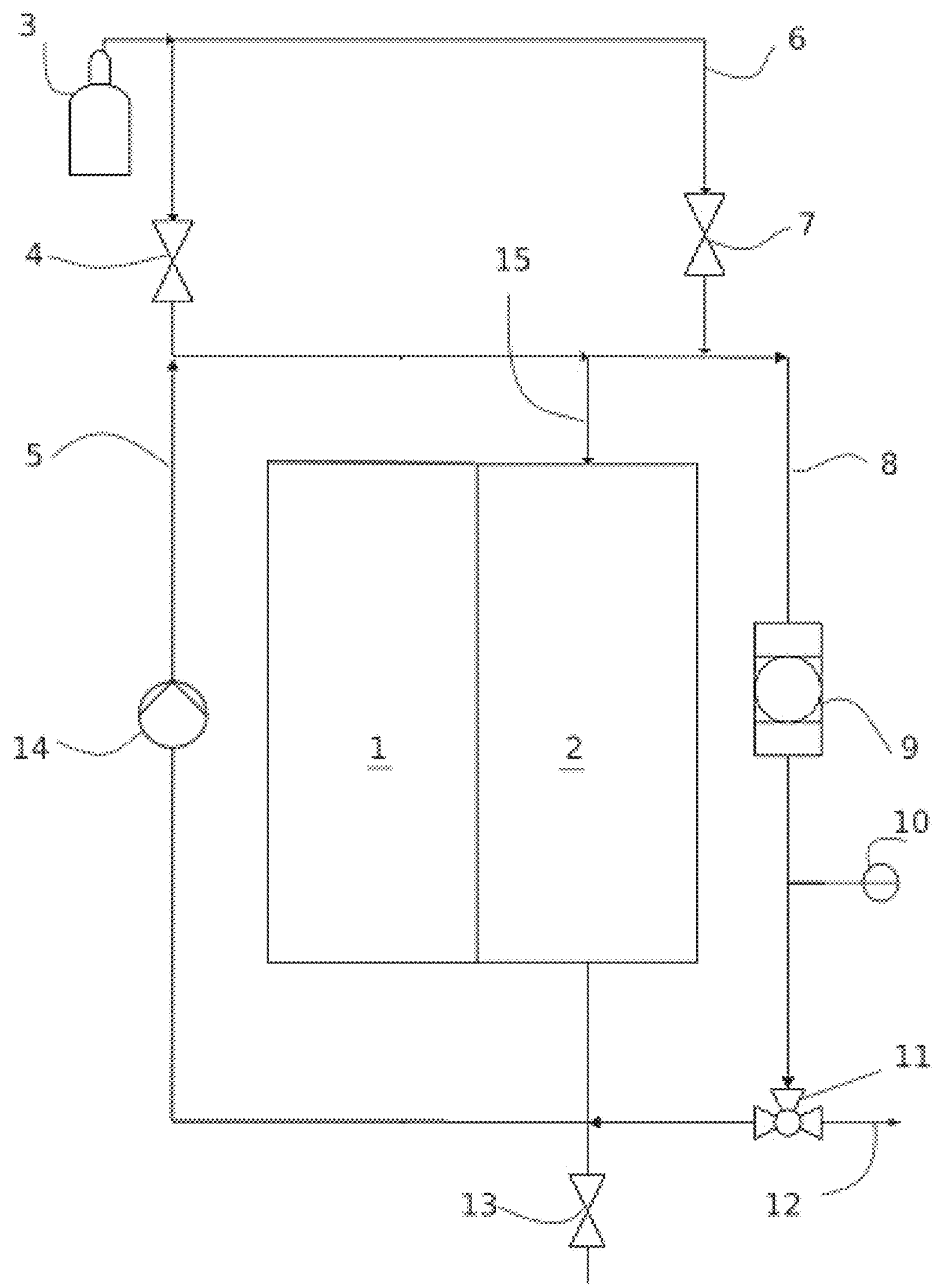
FIG. 1 shows a schematic diagram of an inventive fuel cell system.

In the figures, the following reference numbers are used:

1 cathode
2 anode
3 hydrogen supply tank
4 main fuel valve
5 fuel return line
6 hydrogen feed line for oxygen reduction
7 valve for hydrogen feed to bypass line
8 bypass line
9 oxygen reduction unit
10 hydrogen/oxygen sensor
11 3-way valve
12 contaminant exit pipe
13 anode system purge valve
14 circulation pump
15 fuel (hydrogen) inlet to anode
20 control unit (computer)
21 sensor signal input line
22 actuator signal output line
23 actuator

DETAILED DESCRIPTION OF THE INVENTION

In FIG. 1 is schematically shown an exemplary and non-limiting closed-end hydrogen fuel cell consisting of a cathode 1 and an anode 2 as its main parts. Only the anode piping and lines are shown, the cathode is equipped with similar connections for the intake of air (or oxygen) and the discharge of water, etc.

During normal operation of the fuel cell, hydrogen is supplied from the tank 3 through valve 4 to the fuel inlet 15 of the anode 2. The hydrogen that is not used immediately is circulated from the other end of the anode 2 via the fuel return line 5 and the circulation pump 14 back to the inlet 15.

If the oxygen reduction unit 9 also incorporates a fuel filter, the normal operation also includes letting fuel pass to the bypass line 8 to reach the filter. As the gas in the fuel system under normal operating conditions consists only of moist hydrogen and inert 25 gases, no oxygen reduction or conversion takes place. The filter is designed to cause a pressure drop in such a way that a suitable amount of anode gas will pass through it, for example, 0.5-5% of the hydrogen. A bypass circulation of this size will ensure that a sufficient amount of hydrogen is guided to the anode 2 and still support a continuous removal of impurities. The filter is preferably a slipstream filter arranged to collect 30 impurities like H2S, SO2, NOx, VOC, etc. The removal of these in a hydrogen fuel cell substantially improves the cell's efficiency and consequently it's operating life. The filter can be disposable and changed or they may be regenerated at regular intervals. During a filter cleaning process, contaminants from the filter may be directed to a discharge pipe 12 by a 3-way valve 11. At the same time, inert gases such as nitrogen can be removed from the system.

During a shutdown period of the fuel cell, the main fuel valve 4 is closed and no hydrogen passes through to the inlet 15 from the tank 3 or the return line 5. As has been described above, the internal processes in the fuel cell tends to fill the anode and the anode system including the fuel lines with air (or oxygen). According to the invention, a small amount of hydrogen is passed to the bypass line 8 through the feed line 6 and valve 7. This may happen intermittently during a longer shutdown period, and/or towards the end of the shutdown period, e.g. when the system senses that the fuel cell will be turned into operation. The oxygen burning process is inherently very fast, so the delay caused by the process from the point when e.g. turning a key in a car, is not recognized by the driver.

The hydrogen in the bypass line 8 will circulate through the anode system with the aid of the circulation pump 14, i.e. at system pressure, or by using a dedicated but similar pressure-generating device (not shown). The hydrogen will then mix with any oxygen present in the anode system, and when reaching the oxygen reduction unit 9, the two gases will react with the catalyst present and convert into water, that may be easily removed from the system.

As has been explained above, the amount of hydrogen required to reduce all oxygen in the system may be 4% or less of the volume of air. When all oxygen is consumed and there are only inert gases left in the anode, the main valve 4 for the hydrogen supply can be opened. The hydrogen will first purge the nitrogen present in the anode system through purge valve 13, whereafter a normal working operation of the fuel cell may resume.

Figure 2:
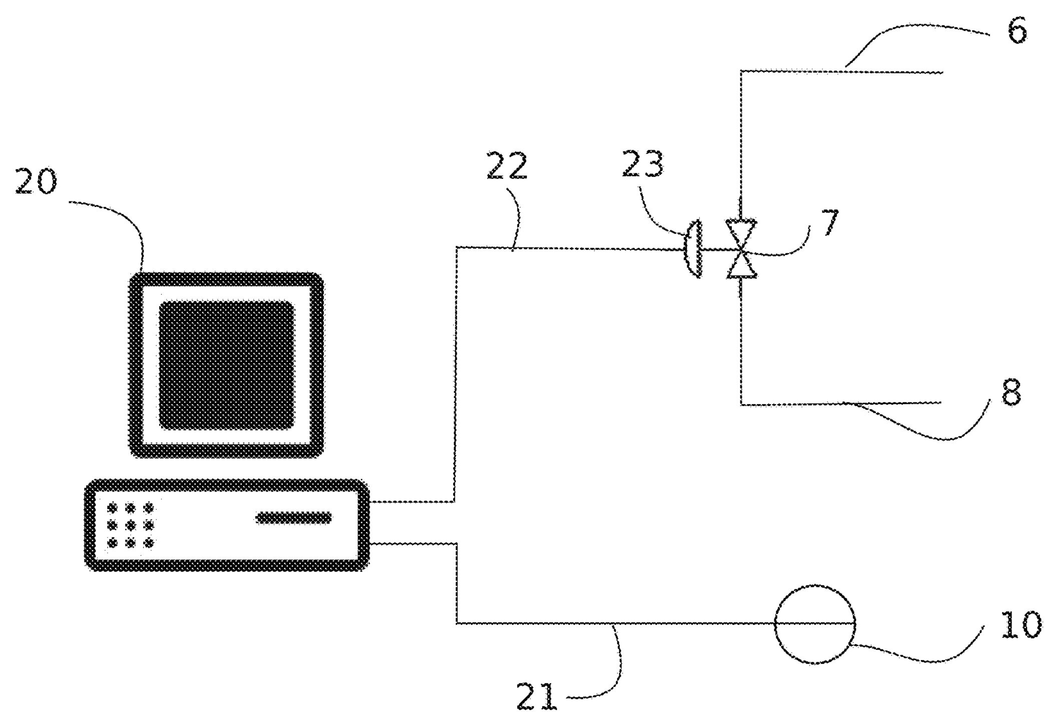
FIG. 2 shows a schematic view of a control system for controlling the start-up of an inventive fuel cell.

The process may be initiated, monitored and/or terminated by a hydrogen and/or oxygen sensor 10, connected to any suitable process control means for operating the valve 7 and the circulation pump 14, among other components, see FIG. 2.

In FIG. 2 is shown a schematic view of a control system for controlling the start-up of an inventive fuel cell as shown in FIG. 1. It comprises a computer 20 fitted with a suitable process control program, which receives as an input sensing signals from one or more gas concentration or humidity sensors 10 via a line 21. The computer system 20 produces an output control signal on line 22 leading to an actuator or operating unit 23 controlling the valve 7. The control system will then provide the appropriate amount of hydrogen to the bypass line 8 from the feed line 6 and via the controllable valve 7. In other words, the control unit 20 monitors the state of the oxygen reduction process in the oxygen reduction unit 9 of FIG. 1.

One exemplary control algorithm would be to use a hydrogen sensor to sense any amount of hydrogen that is passing the oxygen reduction unit 9—any hydrogen passing the unit is an indication of that more hydrogen flows into the bypass line 8 than can be consumed, i.e. converted into water, in the oxygen reduction unit. This information would serve as an indication to the control unit 20 to gradually reduce the amount of hydrogen passing the valve 7, until the valve can be completely closed.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A system for eliminating reverse current decay in fuel cells, comprising:

a fuel cell having an anode and a cathode;

a fuel feed system for supplying the anode of the fuel cell with fuel and comprising an anode fuel feed line for supplying the anode with fuel from the fuel feed system and a fuel return line for circulating unused fuel from the anode back to said fuel feed system;

a bypass line fitted between said anode fuel feed line and said fuel return line in parallel and in flow connection with said anode system and capable of circulating fuel past the anode in a loop;

an oxygen reduction unit included in said bypass line;

a branch from said anode fuel feed line provided with a valve for feeding hydrogen to said bypass line and said oxygen reduction unit during a fuel cell shutdown; and a pressure unit for circulating gas in at least part of said anode system and said bypass line;

wherein the bypass line is adapted to receive and circulate a flow of hydrogen during a fuel cell shutdown in order to mix the hydrogen with any oxygen present in the anode system, and to remove the oxygen from the anode system in said oxygen reduction unit by catalytic conversion.

2. The system according to claim 1, wherein the oxygen reduction unit is disposed in said bypass line.

3. The system according to claim 2, wherein the oxygen reduction unit in said bypass line is combined with a slipstream filter for removing impurities from the gas flow.

4. The system according to claim 1, wherein the system further comprises a control unit for receiving sensing signals representative of the state of the oxygen reduction process in said oxygen reduction unit from at least one sensor, and wherein the control unit in response to said sensor signals controls the amount of hydrogen passing through said valve.

5. A method for minimizing the amount of oxygen present in an anode system of a fuel cell during shutdown, comprising the steps of:

providing a fuel cell with a cathode and an anode and a fuel feed system comprising an anode fuel feed line for supplying the anode with fuel and a fuel return line for circulating unused fuel from the anode back to said fuel feed system;

providing a bypass line fitted in parallel and in flow connection with said anode system capable of circulating fuel past the anode;

feeding during a fuel cell shutdown condition a flow of hydrogen into said bypass line in order to mix the hydrogen with any oxygen present in the anode system:

circulating the gas flow in said bypass line in a loop including said anode fuel feed line and said fuel return line to an oxygen reduction unit;

receiving sensing signals representative of the state of the oxygen reduction process in said oxygen reduction unit from at least one sensor, and controlling in response to said sensor signals the appropriate amount of hydrogen fed to the oxygen reduction unit;

reducing in said oxygen reduction unit any oxygen present in the anode system by catalytic conversion.

6. The method according to claim 5, further comprising the additional step of filtering the gas in said bypass line in order to remove any impurities from the gas flow.

7. The method according to claim 5, wherein gas in said bypass line is circulated in a loop including said anode fuel feed line and said fuel return line.

* * * * *